Jan. 12, 1960  H. A. EVENSON  2,920,756
TRASH BAG AND HANGER FOR AUTOMOBILES
Filed April 30, 1957
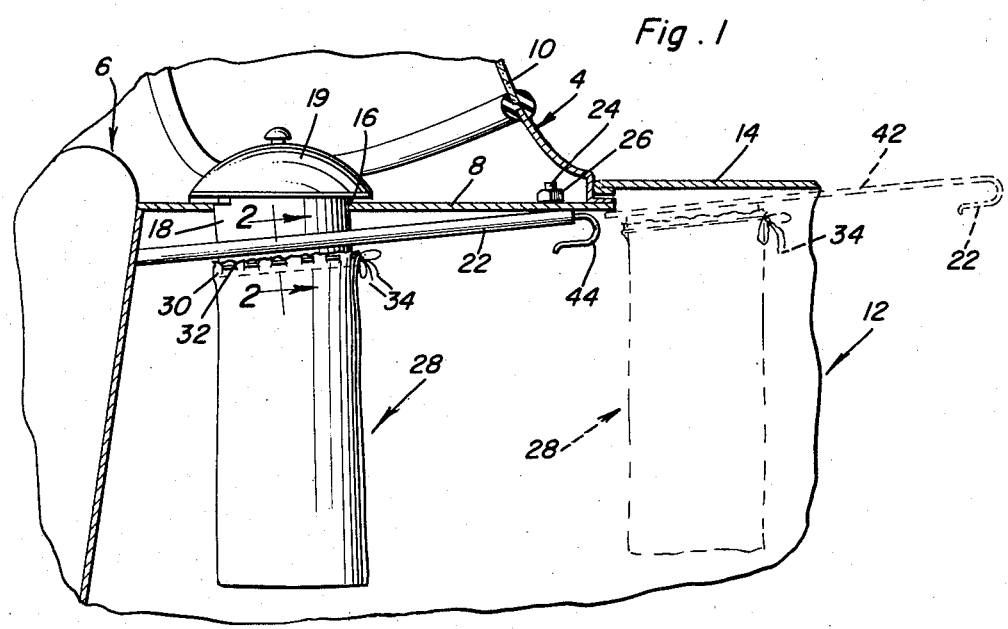
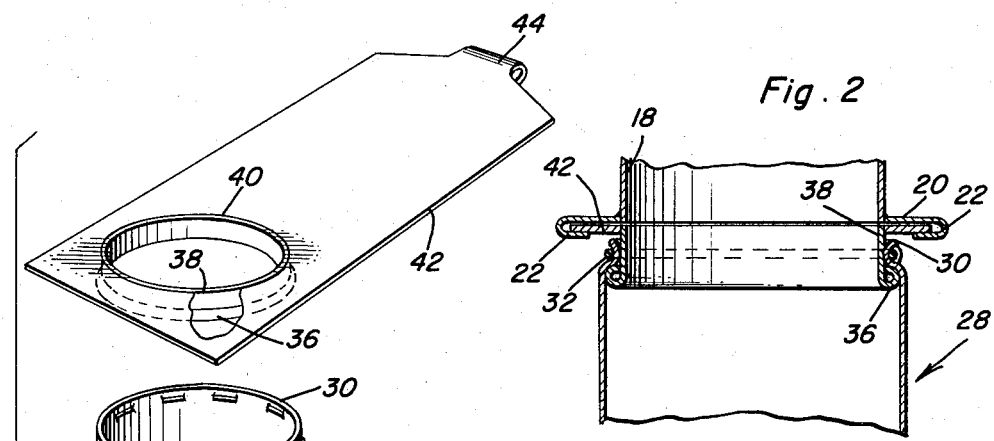
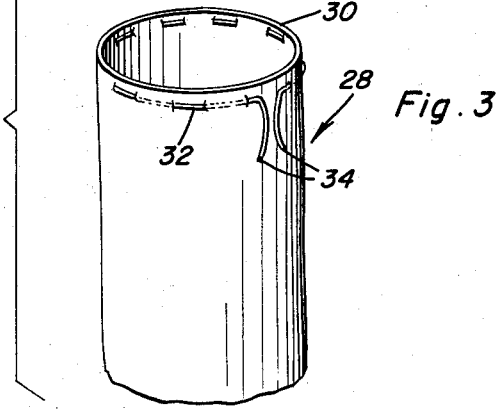
Henry A. Evenson
INVENTOR.

United States Patent Office 2,920,756
Patented Jan. 12, 1960

2,920,756

TRASH BAG AND HANGER FOR AUTOMOBILES

Henry A. Evenson, Rio, Wis.

Application April 30, 1957, Serial No. 656,008

2 Claims. (Cl. 206—19.5)

This invention relates to a trash and refuse bag, a hanger therefor, and means whereby the bag and hanger may be operatively and removably supported from an automobile deck such as is commonly employed between the rear seat and trunk structure in present-day automobiles.

There has long existed a need for readily applicable and removable trash collecting and disposal facilities in automobiles. Not only this, there is a current trend wherein many and varied styles and forms of removable trash receivers have been offered in an effort to satisfactorily solve the problem. An object in the instant presentation is to provide a construction wherein a receptacle, a bag with a drawstring, is accessible by way of the automobile trunk. A trunk type trash receptacle is not new. In fact, such an adaptation is disclosed in my co-pending application, Serial No. 618,994 of October 29, 1956. The construction in the pending matter and also that which is herein revealed utilizes an inclined plate having parallel channel-like open-ended tracks. There is a receiving hole at the center of the plate with an upstanding neck which is attached to a hole in the deck, a suitable removable cover being provided. The receptacle is in the form of a rigid sliding drawer and it has outstanding flanges which are suspended and removably keyed in the marginal tracks on the plate.

In carrying out the instant invention the same track-equipped hanger plate is provided. However, in keeping with the concept herein under consideration a flexible bag, instead of a rigid drawer-like box, serves as the trash receiver. The neck of the bag has a hem and drawstring providing a construction which may be hung from a collar, the collar being provided on a suspension plate and the plate being slidably mounted in the tracks.

Objects, features and advantages not specifically touched upon above will become more readily apparent from the specification, drawing and the invention as claimed.

In the accompanying drawings, wherein like numerals are employed to designate like parts throughout the views:

Fig. 1 is a fragmentary sectional and elevational view showing portions of an automobile trunk and illustrating the trash bag and hanger and how it is constructed and utilized.

Fig. 2 is an enlarged fragmentary view in section taken on the plane of the vertical line 2—2 of Fig. 1 looking in the direction of the arrows.

Fig. 3 is an exploded perspective view detailing the slide and trash bag individually.

Referring now to the drawings the automobile, the rear end portion of which is seen in Fig. 1, as denoted by the numeral 4, the rear seat being denoted at 6 and the aforementioned deck at 8, this being on an elevation above the backrest of the rear seat. This is a more or less conventional part which is inwardly of the rear window 10. The trunk structure is denoted generally by the numeral 12, the hingedly mounted lid thereon being denoted at 14. The invention is installed rearwardly of the seat and wholly beneath the deck and to this end a suitable opening 16 is provided in the deck and this serves to accommodate the intake neck 18 registering with the opening provided therefor and which is carried by the horizontally elongated hanger plate 20. The longitudinal edge portions of the plate are fashioned into open-ended channel-shape tracks 22. The rear end of the plate 20 is partly held by a bolt or stud 24 and nut 26. This arrangement places the rear open ends of the tracks adjacent to the lid or cover 14 of the trunk.

Instead of using a rigid drawer-like box as in the co-pending application Ser. No. 618,994, a cloth, paper or an equivalent sack or bag 28 is employed. This is provided at its upper open end 30 with a drawstring 32, the free ends of which are denoted at 34. The bag is thus constructed to be hung from an endless bead 36 on a depending annular collar 38 registering with an opening 40 in one end of a flat substantially rectangular slide or suspension plate 42. The plate is such that it is slidingly mounted in the tracks 22 and at the rear end a suitable finger-grip 44 is provided. This permits the suspension plate 42 to be slid in and out of the tracks, carrying the collection bag 28 therewith. When the bag is in its useful position it is of course in line with the neck 18 and by taking off the cover 19 occupants of the automobile may drop extinguished cigarette butts, discarded paper napkins, handkerchiefs and other refuse and trash into the bag 28.

The manner of installation of the neck 18 and hanger plate 20 is reasonably clear from the present disclosure but if a more specific description of the same is necessary reference may, of course, be had to co-pending application Ser. No. 618,994 in which this aspect of the over-all concept is more explicitly revealed.

Changes in shape, size, materials and rearrangement of parts may be resorted to in actual practice without departing from the spirit of the invention or the scope of the invention as covered in the sub-joined claims.

What is claimed as new is as follows:

1. An attachment for a deck in an automobile comprising an elongated adapter plate which is such in length and form that it may, and is adapted to, underlie an aperture which is provided therefor in a predetermined portion of an automobile deck, means provided and carried by one end portion of said plate and which is adapted to permit said one end portion of the plate to be detachably connected with an above cooperating portion of the stated deck, said plate being provided with a trash opening and being further provided with a trash receiving neck, said neck being formed integrally with said plate and aligned with and projecting to a position above said opening, said neck being adapted to extend through the opening in the aforementioned deck and being provided at a top portion thereof with a readily applicable and removable cover, a suspension plate located directly beneath said hanger plate and slidingly and removably supported in open-ended channel-shaped tracks provided therefor along the lengthwise edges of the hanger plate, said suspension plate also having a trash opening aligned with the neck and being further provided with a depending collar aligned with said opening and also said neck, and a trash bag detachably hung from said collar.

2. The structure defined in claim 1 and wherein said hanger plate is approximately flat and said suspension plate is likewise generally flat and is disposed in close spaced parallel proximity beneath the hanger plate and, in addition to the collar, is provided at one end with a conveniently located and easily actuatable finger grip.

References Cited in the file of this patent

UNITED STATES PATENTS

| | | |
|---|---|---|
| 458,327 | Lipe | Aug. 25, 1891 |
| 1,897,717 | Appel | Feb. 14, 1933 |
| 1,965,040 | Kelly | July 3, 1934 |
| 2,653,741 | Senk | Sept. 29, 1953 |